J. R. VELLACOTT.
Tension-Attachment for Scroll-Saws.

No. 196,955.  Patented Nov. 6, 1877.

WITNESSES:
H. Rydquist
J. H. Scarborough

INVENTOR:
J. R. Vellacott.
BY
Munn
ATTORNEYS.

UNITED STATES PATENT OFFICE.

JAMES R. VELLACOTT, OF BUFFALO, NEW YORK.

IMPROVEMENT IN TENSION ATTACHMENTS FOR SCROLL-SAWS.

Specification forming part of Letters Patent No. 196,955, dated November 6, 1877; application filed April 16, 1877.

*To all whom it may concern:*

Figure 1:
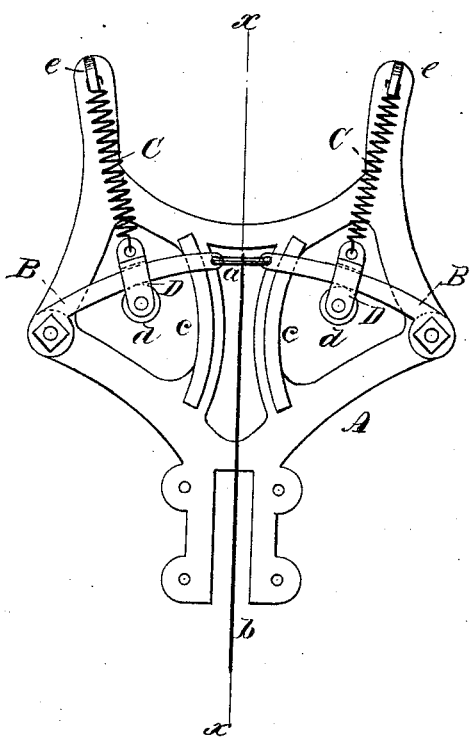
Figure 2:
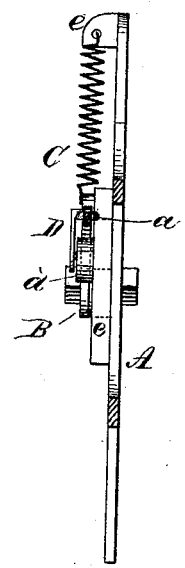

Be it known that I, JAMES R. VELLACOTT, of Buffalo, in the county of Erie and State of New York, have invented a new and Improved Tension Attachment for Scroll-Saws, of which the following is a specification:

Figure 1 is a front elevation. Fig. 2 is a vertical section on line $x\ x$ in Fig. 1.

My invention consists in the combination, with a suitable frame, of two curved levers, connected by a link of flexible material, and drawn upward by spiral springs attached to stirrups, in which are journaled rollers, that travel on the under surface of the said curved levers and equalize the strain upon the saw.

Referring to the drawing, A is a frame, of cast-iron or other suitable material, which is of sufficient width to receive the levers B, and is provided with two vertical arms for receiving the coil-springs C. The levers B are pivoted to opposite edges of the frame A, and are oppositely arranged with respect to each other.

The arms of the levers are arranged tangentially in relation to their pivots, and are placed with their concaved sides downward. Their free ends are drilled to receive the flexible link $a$, to the center of which a cord, strap, or wire, $b$, is attached, which is also connected with the upper end of the saw.

Guides $c\ c$ are formed on the surface of the frame for the purpose of steadying the ends of the levers B.

D D are stirrups that straddle the levers B, and contain the rollers $d$, that rest against the under surface of the said levers. The stirrups D are attached to coil-springs C, the upper ends of which are hooked into ears $e$, that project from the face of the vertical arms of the frame A.

This tension device is automatic in its adjustment, giving an equal strain upon the saw through its entire stroke, as the rollers follow the curved surface of the levers toward their fulcrums as they are drawn down.

Having thus described my invention, I claim as new and desire to secure by Letters Patent—

The curved levers B, elastic link $a$, stirrups D, rollers $d$, spring C, and frame A, in combination, substantially as shown and described.

JAMES RICHARD VELLACOTT.

Witnesses:
 JOSEPH NELSON GREGORY,
 NATHANIEL HOWARD TUCKER.